United States Patent [19]

Manzoni

[11] Patent Number: 4,824,065
[45] Date of Patent: Apr. 25, 1989

[54] REARVIEW MIRROR FOR VARIOUS VEHICLES UTILIZING FRICTION BEARING SURFACE

[75] Inventor: Stéphane Manzoni, Saint-Claude, France

[73] Assignee: Societe Manzoni Bouchot, France

[21] Appl. No.: 146,979

[22] Filed: Jan. 22, 1988

[30] Foreign Application Priority Data

Jan. 23, 1987 [FR] France ............... 87 00796

[51] Int. Cl.[4] ............................................. A47G 1/24
[52] U.S. Cl. ..................... 248/483; 248/484
[58] Field of Search ............. 248/483, 484, 485, 468, 248/475.1, 476, 479, 481; 350/632, 639

[56] References Cited

U.S. PATENT DOCUMENTS

| 2,533,475 | 12/1950 | Koonter | 248/483 X |
| 3,367,616 | 2/1968 | Bausch et al. | 248/483 |
| 3,474,998 | 10/1969 | Talbot | 248/483 |
| 3,601,352 | 8/1971 | Jensen et al. | 248/484 X |
| 4,523,736 | 6/1985 | Manzoni | 248/483 |
| 4,592,529 | 6/1986 | Suzuki | 248/475.1 |
| 4,613,107 | 9/1986 | Vitaloni | 248/476 X |
| 4,636,045 | 1/1987 | Suzuki | 350/632 X |
| 4,651,965 | 3/1987 | Vigna et al. | 248/483 |

FOREIGN PATENT DOCUMENTS

| 1266653 | 4/1968 | Fed. Rep. of Germany . |
| 2311689 | 5/1975 | France . |
| 2499483 | 8/1982 | France . |
| 2569638 | 3/1986 | France . |
| 0783543 | 9/1957 | United Kingdom ............... 248/483 |

Primary Examiner—Ramon O. Ramirez
Attorney, Agent, or Firm—Remy J. VanOphem

[57] ABSTRACT

The invention relates to a rearview mirror having a mirror-holder casing, a fixed base, a connecting mechanism interposed between the casing and the base and members for guiding pivoting of the casing about a substantially vertical, forward-rearward axis and a substantially horizontal upward-downward axis. Friction bearing surfaces combined with the members for guiding pivoting of the casing cooperate to create friction couples resisting the pivoting. The rearview mirror further has two distinct springs cooperating, respectively, with at least one bearing surface for guiding upward-downward pivoting and at least one bearing surface for guiding forward-rearward pivoting.

10 Claims, 2 Drawing Sheets

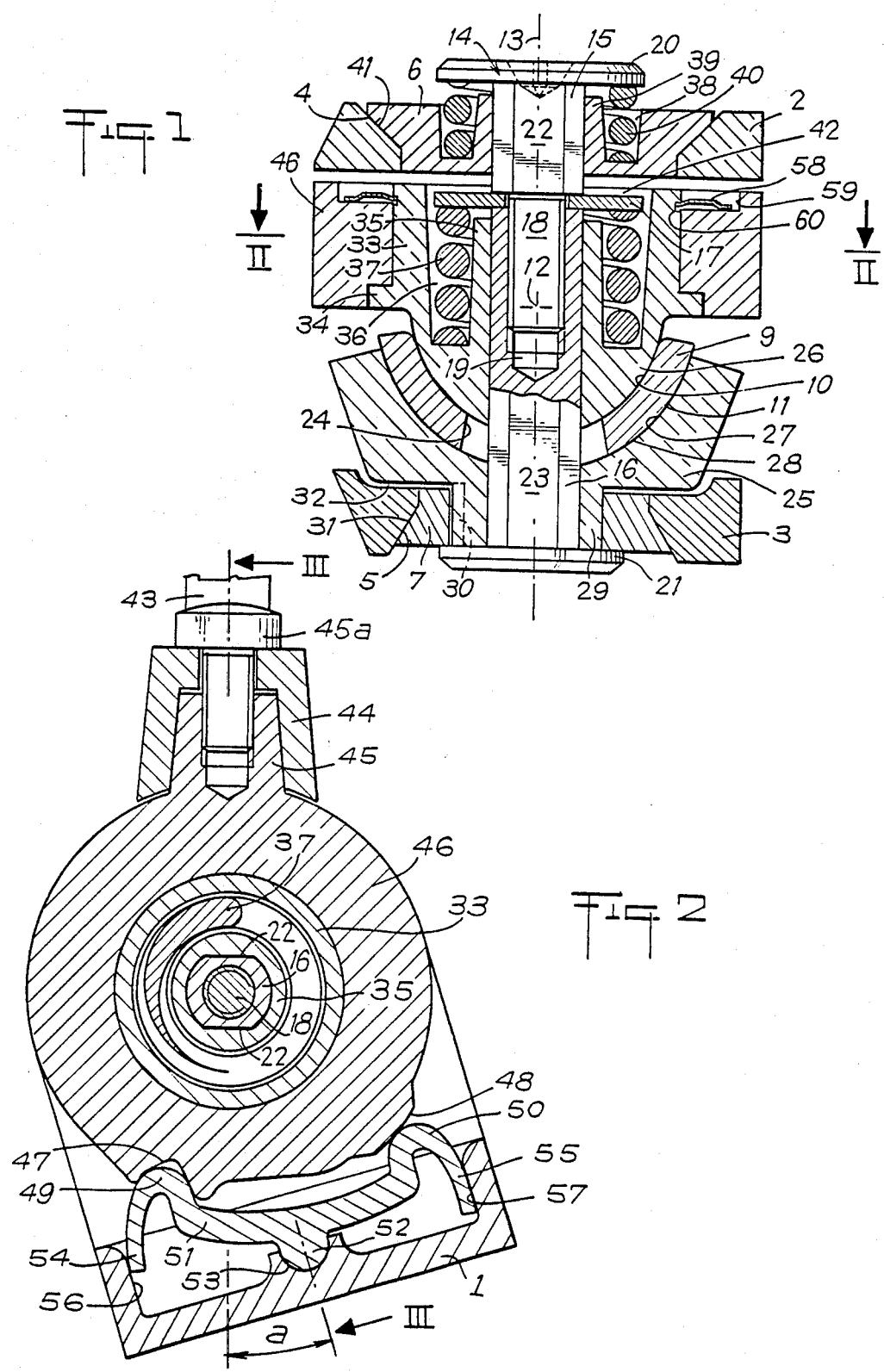

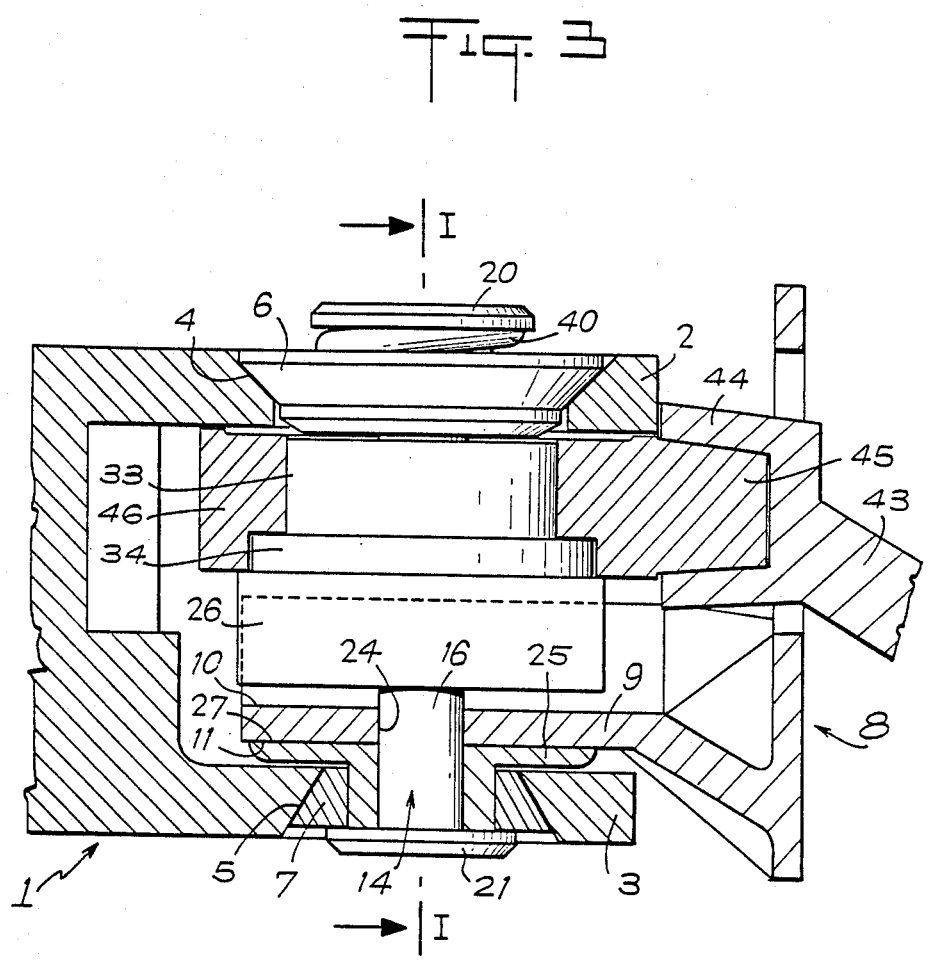

REARVIEW MIRROR FOR VARIOUS VEHICLES UTILIZING FRICTION BEARING SURFACE

BACKGROUND OF THE INVENTION

1. Field of the Invention

The present invention relates to a rearview mirror for various vehicles, particularly for an automobile vehicle.

2. Description of the Prior Art

The rearview mirror of the type described in French Pat. No. 2,569,638 includes a mirror-holder casing extended by a fork joint between the arms of which extends a cylindrical appendix of a fixed base adapted to be mounted on the vehicle. A fixed jaw presenting two friction bearing surfaces, one plane and the other cylindrical, respectively, is interposed between the fixed appendix and one of the arms of the fork joint to be manoeuvred. A mobile jaw presenting two friction bearing surfaces, one plane and the other cylindrical, respectively, is interposed between the fixed appendix and a mobile piece borne by the other arm of the fork joint. A forward-rearward pivot pin passes through the arms of the fork joint, the jaws, the appendix and the mobile piece. A single spring abutting on a stop of the pin pushes the mobile piece, which is guided in the fork joint in the direction of the pin to press all the friction bearing surfaces against one another. Finally, an indexing device is interposed between the mirror-holder casing and the appendix of the fixed base in order that, in the event of a shock, the rearview mirror can retract forwardly or rearwardly by elastic deformation of a member of the indexing device.

In this known rearview mirror, it is relatively difficult to adjust with respect to one another the efforts of manoeuvring for the forward-rearward pivoting about the axis by friction of the plane bearing surfaces and for upward-downward pivoting about the appendix by friction of the cylindrical bearing surfaces. In fact, for the dimensions of the internal pivoting mechanism to remain within admissible limits, the cooperating pieces must be adapted to one another by acting on the nature of the materials of which they are constituted. The search for maximum reliability and minimum cost is not compatible with this. In addition, it is nonetheless impossible to obtain a fine adjustment of the ratio between these efforts.

Attempts to incorporate springs within the known device have been made for specific purpose. For example French Pat. No. 2,311,689 discloses a rearview mirror having a base and a casing in which a mirror is adjustable in forward-rearward position and in upward-downward position. A double articulation connecting the casing to the base and through which extends the control of the mirror is disclosed therein. The articulation is designed toa llow retraction of the casing in the event of a shock and its indexing in neutral position. It has two vertical-axis cylindrical bosses opposing their convexity and applied against an intermediate hollow spacer piece, the assembly being traversed by a tubular bush provided for the passage of the control mentioned above. A first spring is interposed between a shoulder of the bush and the first boss of the base; a second spring is interposed between a nut of the bush and the second boss of the casing.

The springs, therefore, do not allow adjustment of the mirror, but retraction of th casing under the effect of a shock, the ribs on the bosses and the grooves in the spacer piece ensuring indexing.

German Pat. No. 1,266,653 discloses a rearview mirror having abase on which is mounted a casing containing a fixed mirror. As shown in FIG. 2, the function of forward-rearward and upward-downward adjustment is ensured by a ball joint of the casing applied against a likewise spherical bearing surface of the base by a single spring. For retraction in the event of a shock, a rod extending the ball joint traverses an elongated slot in the casing and may slide therein. Indexing is ensured by the penetration, under the action of another spring, of a boss of the ball joint in a recess in the casing.

The first spring allows adjustment of the mirror in all directions, while the second spring allows only retraction in the event of shock and indexing. Accordingly, what is needed is a reliable, cost effective adjustment feature providing for the fine adjustment of the ratio between the aforementioned efforts.

SUMMARY OF THE INVENTION

It is an object of the present invention to overcome these drawbacks by proposing improvements to a rearview mirror of the type which includes, a mirror-holder casing, a fixed base adapted to be mounted on the vehicle, a connecting mechanism interposed between the casing and the base having selective means for guiding pivoting of the casing about a substantially vertical forward-rearward axis and a substantially horizontal upwarddownward axis, respectively, and friction bearing surfaces combined with the guiding means for cooperating with elastic means for generating friction couples which resist pivoting.

In accordance with the invention, two distinct springs cooperate, respectively, with at least one bearing surface for guiding upward-downward pivoting and at least one bearing surface for guiding forward-rearward pivoting.

In the invention, the means for guiding forward-rearward pivoting cooperate with two conical friction bearing surfaces, which are opposite and have different inclinations.

In a particularly advantageous embodiment, the rearview mirror has a forward-rearward pivot pin which passes through the arms of a fork joint of the mirror-holder casing and a cylindrical appendix of the fixed base for upward-downward pivoting. According to the invention, the pivot pin has, on one side of the appendix, a first end stop on which rests a cylindrical fixed jaw and a conical fixed jaw cooperating, respectively, with the fixed appendix and a seat of one of the arms of the fork joint.

On the other side of the appendix, on the one hand, a second end stop abuts a first spring applied against a conical mobile jaw cooperating with a seat of the other arm of the fork joint, and on the other hand, an intermediate stop abuts a second spring applied against a cylindrical mobile jaw cooperating with the fixed appendix. Clearance is provided between the cylindrical fixed jaw and the contiguous arm of the fork joint, as well as the conical fixed jaw, and also between the conical mobile jaw and the intermediate stop of the pivot pin. The second spring, thus, ensures tightening of the cylindrical jaws against the fixed appendix for upward-downward positioning of the pivot pin with respect to the latter, while the first spring independently ensures tightening of the conical jaws against the seats of the fork joint in order to position the latter forwardly-rearwardly with respect to the pivot pin.

In the event the rearview mirror is provided with a control ring coupled to the casing via an indexing device, it is possible to retract, under the effect of a shock, the rearview mirror forwardly or rearwardly, as the control ring is mounted to rotate about the cylindrical mobile jaw and be immobilized in translation relative to the jaw.

Advantageously, the control ring is interposed between a flange of the cylindrical mobile jaw and a washer fitted in a groove in the jaw, the washer being elastically deformable.

BRIEF DESCRIPTION OF THE DRAWINGS

The invention will be more readily understood on reading the following description with reference to the accompanying drawings, in which:

FIG. 1 is an axial transverse section through the rearview mirror taken along line I—I of FIG. 3;

FIG. 2 is a sectional view taken along line II—II of FIG. 1; and

FIG. 3 is a sectional view taken along line III—III of FIG. 2.

DETAILED DESCRIPTION OF THE PREFERRED EMBODIMENT

Referring now to the drawings, the rearview mirror has a mirror-holder casing 1 extended by a fork joint whose arm 2 and 3 define coaxial orifices outwardly bordered by conical seats 4 and 5. These seats converge towards each other and cooperate with conical jaws 6 and 7, respectively.

The rearview mirror also includes a fixed base 8 adapted to be mounted on a vehicle, for example on a door. The base is extended by an appendix 9 (FIG. 3) which has the form of a portion of a cylindrical tube of the which the angular aperture is slightly less than 180°. The appendix forms two cylindrical seats 10 and 11 which are concentric with respect to each other and to a geometrical axis 12 extending perpendicularly to a geometrical axis 13 located in the plane of symmetry of the appendix.

The assembly described hereinbelow enables the axis 13 to merge with that of the conical seats 4 and 5 of the casing 1. The rearview mirror, in fact, has a material axis or pin 14 constituted by two cylindrical parts 15 and 16 connected to each other, gripping a washer 17 forming an intermediate stop, by a threaded end piece 18 of one screwed in a tapped hole 19 of the other. The cylindrical parts 15 and 16 form part of heads 20 and 21, respectively, forming end stops. In addition, the cylindrical parts 15 and 16 are provided with flat portions 22 and 23 to permit the pieces described hereinafter to slide without rotating.

The pin 14 passes through a slot 24 in the fixed appendix 9, such that it may pivot about the geometrical axis 12 of the appendix without being prevented from doing so. The rearview mirror, in addition to the pin 14, has a fixed cylindrical jaw 25 and a mobile cylindrical jaw 26 which have, respectively, a concave bearing surface 27 and a convex bearing surface 28 applied on either side against the appendix 9.

The fixed cylindrical jaw 25 extends below the appendix and is extended by a bushing 29. the jaw 25 and the bushing 29 define a bore whose section is complementary to that of the cylindrical part 16 of the pin 14 in order to be able to slide therealong without rotating therearound.

The conical jaw 7 is mounted to slide along the bushing 29 and be immobilized in rotation therearound by a pin 30.

The conical jaw 7 and the fixed cylindrical jaw 25 are in abutment on the head or end stop 21 and applied by their bearing surfaces 31 and 27, respectively, against the conical seat 5 of the arm 3 of the casing and the cylindrical seat 11 of appendix 9.

A clearance 32 is provided between the conical jaw 7 and the fixed cylindrical jaw 25, as well as between the fixed cylindrical jaw 25 and the arm 3.

The mobile cylindrical jaw 26 extends above the appendix 9 and is extended by an outer sleeve 33 with a projecting flange 34 and an inner bushing 35 defining therebetween an annular chamber 36. The mobile cylindrical jaw 26 and the bushing 35 define a bore whose section is complementary to that of the cylindrical part 16 of the pin 14 in order to be able to slide along it without rotating therearound.

The fixed and mobile cylindrical jaws 25 and 26, respectively, are pressed against the appendix 9 by a helical spring 37 abutting on the washer or intermediate stop 17 of the pin 14. The spring is housed in the annular chamber 36.

The conical jaw 6 defines a chamber 38 around a central bushing 39 which defines a bore whose section is complementary to that of the cylindrical part 15 of the pin 14 in order to be able to slide along it without rotating therearound. A spring 40 is housed in the chamber 38 and abuts on the head or stop 20 in order to press a bearing surface 41 of the conical jaw 6 against the seat 4 of the arm 2 of the casing 1 and the bearing surface 31 of the conical jaw 7 against the seat 5 of the arm 3 of the casing 1.

A clearance 42 is provided between the conical jaw 6 and the intermediate stop 17.

The rearview mirror as described may be manoeuvred from the outside by acting on the mirror-holder casing 1 to pivot it upwardly and downwardly about the geometrical axis 12 of the appendix 9 of the fixed base 8 and/or forwardly and rearwardly about the geometrical axis 13 of the material axis or pin 14. To resist such pivoting and, thus, to ensure stability of the mirror, i.e. without uncontrolled loss of adjustment and without parasitic vibrations, the springs 37 and 40 generate couples of friction of the fixed and mobile cylindrical jaws 25 and 26 on the appendix 9 and of the conical jaws 6 and 7 on the arms 2 and 3 of the casing, the pin 14 ensuring that each of the jaws are fixed relative to the appendix 9 and independent of the action of the springs 37 and 40. Consequently, it will be very easy, utilizing predetermined dimensions of the mechanism and conventional materials for the gripping pieces, to differentiate the friction couples and to adapt them as required, simply by acting on the springs and their characteristics.

Advantageously, the conical jaw 7 predominantly ensures centering and the conical jaw 6 tightening. To that end, the angle of inclination with respect to the axis 13 is smaller for the conical jaw 7 than for the conical jaw 6.

The rearview mirror may also be remote-controlled, from inside the vehicle, by means of electric motors, traction cables, a direct-hold control lever, or the like.

The following description relates to control by a lever 43 (FIGS. 2 and 3), which includes a cap 44 adapted to be fitted on a protuberance 45 of a control ring 46 and to be fixed thereto by means of a screw 45a.

The control ring 46 is mounted to rotate about the outer sleeve 33 of the mobile cylindrical jaw 26 and be immobilized in translation relative to the latter. In particular, the control ring 46 is interposed between the flange 34 of the mobile cylindrical jaw 26 and a washer 58 abutting on the bottom of a housing 59 of the control ring and fitted in a groove 60 in the outer sleeve 33. The washer may be elastically deformable in order to support the adjustments of clearance.

The control ring 46 has a notch 47 and a boss 48 cooperating with pushers 49 and 50 formed, by bending the ends of an elastically deformable indexing blade 51 which abuts the casing 1 at its center and at its ends, as illustrated in FIG. 2. This abutment must be such that the blade immobilizes the control ring 46 relative to the casing 1 for the control lever 43 to transmit its upward-downward and forward-rearward pivoting to the casing; however, this abutment must also be such that the blade tips release the control ring in the event of a shock on the casing, forwardly or rearwardly, so that the control ring may then pivot without impedance outside the limits of manoeuvre of the control lever 43. The abutment is constituted by a central pivot 52 of the blade, in the form of an elongated cutter, placed in a housing 53 in the casing and by end flanges 54 and 55 of the blade which curve inwardly concentrically to the pivot and are disposed against walls 56 and 57 of the casing. In the event of a shock as mentioned above, the pusher 49 leaves the notch 47 and the pusher 50 is displaced from the boss 48; the indexing blade 51 relaxes and the casing pivots without constraining the lever. In order to index the casing again, it suffices to pivot it by hand in the opposite direction with sufficient firmness for the pushers 49 and 50 to pass beyond the inclined ramps which border the notch 47 and the boss 48, causing the indexing blade 51 to bend, and to take position at the end of the stroke in the notch and on the boss.

By acting on the control lever 43, the mirror-holder casing 1 is driven in a forward-rearward pivoting motion about the pin 14 which is fixed, under the action of the spring 37, by the fixed and mobile cylindrical jaws 25 and 26 on the appendix 9 of the base 8, the operator having to overcome the friction couple generated by the spring 40 between the seats 4 and 5 of the casing and the bearing surfaces 41 and 31 of the conical jaws 6 and 7 which are immobilized in rotation by the pin.

The mirror-holder casing 1 is further pivoted upwardly-downwardly around the geometrical axis 12 of the appendix 9, as the casing is coupled to the fixed and mobile cylindrical jaws 25 and 26 via the pin 14 to which it is connected by the conical jaws 6 and 7, which in this direction of rotation is considered to be fixed to the seats 4 and 5 by the thrust exerted by the spring 40. The operator has to overcome, for this pivoting, the friction couple generated by the spring 37 between the appendix 9 and the concave and convex bearing surfaces 27 and 28 of the fixed and mobile cylindrical jaws 25 and 26, which are immobilized in rotation by the pin.

The above mentioned clearances 32 and 42 guarantee the position of the arms 2 and 3 of the fork joint relative to the pin 14 and of the pin relative to the appendix, as well as to the independent action of the springs 37 and 40.

Although the best mode contemplated by the Inventor for carrying out the present invention as of the filing data hereof has been shown and described herein, it will be apparent to those skilled in the art that suitable modifications and variations may be made thereto without departing from what is regarded as the scope of the invention, which invention is to be limited only by the terms of the following claims.

What is claimed is:

1. A rearview mirror for a vehicle, said rearview mirror comprising:
   a casing having a forked extension portion defining two arms, each arm of said forked extension portion having a bore therein, each said bore of each of said arms having a central axis axially aligned to define a transverse axis, each said bore further being circumscribed by a conical seat;
   a first conical jaw mounted to said conical seat of one of said bores in one of said two arms, said first conical jaw having a passage therein;
   a second conical jaw mounted to the other conical seat of the other of said bores in the other of said two arms;
   a fixed cylindrical jaw juxtaposed said second conical jaw, said fixed cylindrical jaw being spaced a predetermined distance from said second conical jaw and one of said arms to allow movement of said fixed cylindrical jaw relative to said other of said conical seat, said fixed cylindrical jaw having a passage therein;
   a fixed base mounted to said vehicle, said fixed base having a cylindrical extension portion, said cylindrical extension portion interposed between said fixed cylindrical jaw and said mobile cylindrical jaw for intimate communication therewith, said cylindrical extension portion further having a passage therein;
   means for pivoting said casing in a first predetermined direction a predetermined distance about said transverse axis; and
   means for tilting said mobile cylindrical jaw in a second predetermined direction, said second predetermined direction being about the locus of said mobile cylindrical jaw.

2. The rearview mirror as claimed in claim 1 wherein said means for pivoting said casing in a first predetermined direction about said transverse axis further comprises:
   a pin member centrally disposed along said transverse axis, said pin member being mounted in said passages of said first conical jaw, said mobile cylindrical jaw, said cylindrical extension portion of said fixed base, and said fixed cylindrical jaw, respectively, said pin member further having a head portion located against said second conical jaw at one end thereof and a second head portion extending from said first conical jaw at the opposite end thereof; and
   first means for biasing said pin member, said first means for biasing disposed between said first conical jaw and said second head portion of said pin member such that said first means for biasing causes a friction resistance by the interaction of said first and second conical jaws mounted to each respective conical seat of each said two arms of said extension portion of said casing whereby said friction resistance by the independent adjustment of said first means for biasing selectively resists said means for pivoting said casing in a first predetermined direction about said transverse axis.

3. The rearview mirror as claimed in claim 1 wherein said means for tilting said mobile cylindrical jaw in a second predetermined direction further comprises:
   a pin member centrally disposed along said transverse axis, said pin member being mounted in said passages of said first conical jaw, said mobile cylindrical jaw, said cylindrical extension portion of said fixed base, and said fixed cylindrical jaw respectively, said pin member further having a head portion located against said second conical jaw at one end thereof and a second head portion at the opposite end thereof;
   a stop member mounted intermediate said head portion and said second head portion of said pin member, said stop member further being located a predetermined distance from said mobile cylindrical jaw; and
   second means for biasing interposed said stop member and said mobile cylindrical jaw, said second means for biasing causing a second friction resistance by the interaction of said cylindrical extension portion of said fixed base with said mobile and fixed cylindrical jaws whereby said second friction resistance, by the independent adjustment of said second means for biasing, selectively resists said means for tilting said mobile cylindrical jaw in said second predetermined direction.

4. The rearview mirror as claimed in claim 1 further comprising:
   a central ring mounted to said mobile cylindrical jaw;
   means for indexing said central ring relative to said casing, said means for indexing further having shock retraction means such that under the effect of a shock load said shock retraction means allows said mobile cylindrical jaw to pivot in said first predetermined direction beyond said predetermined distance.

5. The rearview mirror as claimed in claim 2 further comprising:
   a central ring mounted to said mobile cylindrical jaw;
   means for indexing said central ring relative to said casing, said means for indexing further having shock retraction means such that under the effect of a shock load said shock retraction means allows said mobile cylindrical jaw to pivot in said first predetermined direction beyond said predetermined distance.

6. The rearview mirror as claimed in claim 3 further comprising:
   a central ring mounted to said mobile cylindrical jaw;
   means for indexing said central ring relative to said casing, said means for indexing further having shock retraction means such that under the effect of a shock load said shock retraction means allows said mobile cylindrical jaw to pivot in said first predetermined direction beyond said predetermined distance.

7. The rearview mirror as claimed in claim 1 wherein said conical seat of one of said two arms has a first predetermined inclined axis and wherein further said conical seat of the other of said two arms has a second predetermined inclined axis.

8. The rearview mirror as claimed in claim 7 wherein said first predetermined inclined axis has an inclination less than the inclination of said second predetermined inclined axis.

9. The rearview mirror as claimed in claim 2 wherein said conical seat of one of said two arms has a first predetermined inclined axis and wherein further said conical seat of the other of said two arms has a second predetermined inclined axis.

10. The rearview mirror as claimed in claim 9 wherein said first predetermined inclined axis has an inclination less than the inclination of said second predetermined inclined axis.

* * * * *

UNITED STATES PATENT AND TRADEMARK OFFICE
CERTIFICATE OF CORRECTION

PATENT NO. : 4,824,065

DATED : April 25, 1989

INVENTOR(S) : Stephane Manzoni

It is certified that error appears in the above-identified patent and that said Letters Patent is hereby corrected as shown below:

On the title page item [54] and

Column 1. line 2, delete "SURFACE" and insert ---- SURFACES ----.

Column 1. line 57, delete "toa llow" and insert ---- to allow ----

Column 1. line 68, delete "th" and insert ---- the ----.

Column 2. line 4. delete "abase" and insert ---- a base ----.

Column 2. line 30, delete "upwarddownward" and insert ---- upward-downward ----.

Column 3. line 39, delete "the".

Column 3. line 66, delete "the"  should read --The--

Column 4. line 10. after "of" insert ---- the ----.

Column 5. line 68. delete "data" and insert ---- date ----.

Signed and Sealed this

Twenty-second Day of May, 1990

Attest:

HARRY F. MANBECK, JR.

*Attesting Officer*  *Commissioner of Patents and Trademarks*